Nov. 20, 1928.  R. L. SANCHEZ  1,691,939
DETACHABLE SIGN FOR VEHICLES
Filed Aug. 14, 1926
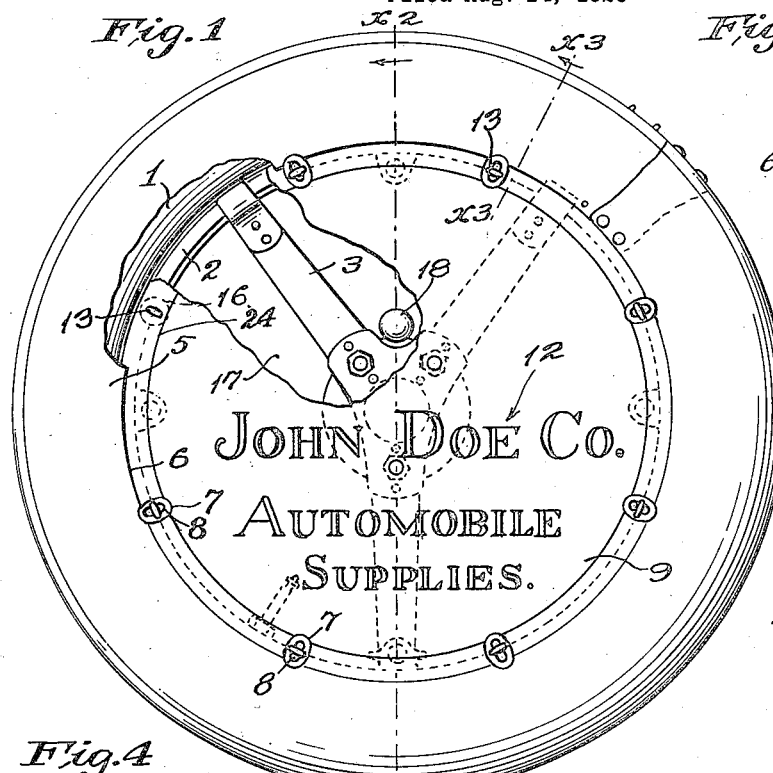
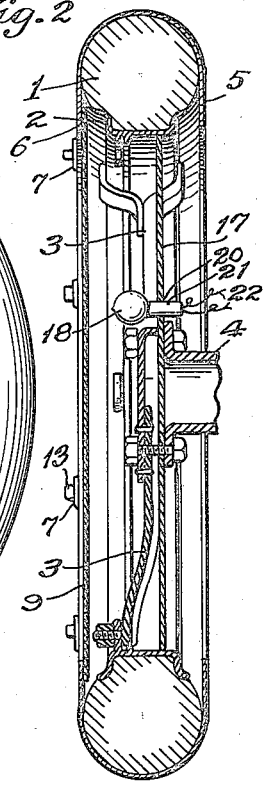
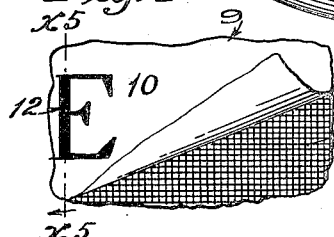
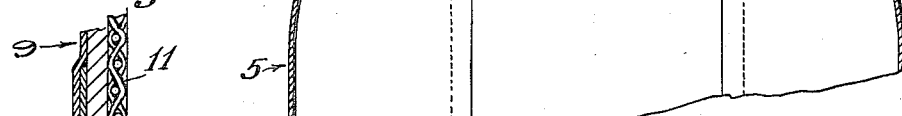
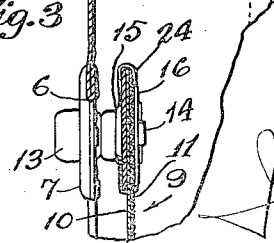
Inventor
Roman L. Sanchez
by James R. Townsend
his atty
Witness
C. C. Holly Patented Nov. 20, 1928.

1,691,939

UNITED STATES PATENT OFFICE.

ROMAN L. SANCHEZ, OF LOS ANGELES, CALIFORNIA, ASSIGNOR OF ONE-THIRD TO MIRIAM R. EGBERT, OF LOS ANGELES, CALIFORNIA.

DETACHABLE SIGN FOR VEHICLES.

Application filed August 14, 1926. Serial No. 129,194.

It is common to support on the rear ends of vehicles having pneumatic tires, a spare pneumatic tire usually covered with a tire cover.

An object of this invention is to utilize such spare tire in a profitable and convenient manner for the purpose of attractive advertising.

An object is to make provision whereby the owner of a vehicle adapted to carry a spare pneumatic tire can profitably use the spare tire in the business of advertising for numerous clients at different periods of time, and especially attractive at night.

An object of this invention is to make provision whereby the person conducting the advertising business may equip himself with a large number of advertisements and can conveniently store such equipment in a small space, and can conveniently and easily change from one advertisement to another.

The invention comprises the combination with a spare tire; of a translucent sheet adapted to close one end of the space surrounded by the spare tire; means to detachably secure said sheet to said tire and a lamp to illuminate the sheet through such space and from within the tire, and in carrying out the invention I employ the tire cover as frame means for supporting said translucent sheet, and I have provided such cover and the rim of the sheet with cooperating fasteners adapted to be detachably attached to each other to hold the translucent sheet in place to close the rear end of the central opening of the tire; and I have closed the forward end of the tire surrounded space with a light diffusing reflector arranged to direct light onto the inner side of the translucent sheet and I provide such sheet with advertising matter which may be opaque or may be of a translucent character adapted to color the light passing therethrough from within the frame formed by the tire; and I provide a light between the reflector and the translucent sheet in the form of an electric lamp.

Another object of the invention is to make provision whereby the translucent sheets may be cheaply made and may be strong, light and not likely to be injured by the weather; and to make provision whereby the same sheet may be used successively for different advertisements.

The tire may be of any desired kind, it being necessary that it be of sufficient thickness to form a frame enclosing a light diffusing chamber the outer light diffusing wall of which chamber is sufficiently removed from the inner wall to allow the light to be diffused from a lamp located at the further wall of such chamber.

The thickness of a pneumatic tire in common use on automobiles affords room for such diffusion.

Other objects, advantages and features of invention may appear from the accompanying drawing, the subjoined detailed description and the appended claim.

The accompanying drawing illustrates the invention.

Figure 1 is a fragmental view of an advertising device constructed in accordance with this invention as applied to the rear of an automobile, fragments of which are shown; parts are broken to expose parts that are otherwise hidden.

Fig. 2 is a sectional elevation on line $x^2$, Fig. 1.

Fig. 3 is a fragmental sectional detail on an enlarged scale.

Fig. 4 is a fragmental face view detail of the detachable sheet, showing the different layers in exaggerated size.

Fig. 5 is an enlarged cross-section on line $x^5$, Fig. 4.

The annular spare tire 1 may be of any usual construction and is shown mounted on a rim 2 supported by a spider 3 that is carried by an arm 4 fixed in the usual way to the body of an automobile or other vehicle, not shown. 5 is an annular tire cover of usual construction provided on its inner front margins 6 with fastener tabs 7 having elongate holes 8.

9 is a translucent sheet which may be of any suitable strong material that will serve the purpose, which according to my improved construction consists of a layer 10 of parchment paper having a rear facing 11 of fabric cemented to the parchment paper by any suitable translucent cement as common glue.

The advertisement or sign 12 is preferably applied to the outside of the parchment paper sheet and said side of the sheet is varnished over to protect the water color, so that when the owner wishes, he may, by the use of alcohol, remove the varnish and then by the use of water remove the sign, leaving the parchment paper surface free to receive another sign or advertisement.

It is understood that if desired, said sign or advertisement may be painted on the parchment paper in oil and will then be more or less permanent.

The sheet 9 is provided around its rim with swivel fastener heads 13 of common oblong construction, swivelled by shanks 14 to clamp plates 15, 16 clamping the sheet 9 between them.

The fastener heads 13 are adapted to be extended through the fastener tabs from within the tire cover margin so that when all of the fasteners are in fastening position, the sheet will be mounted within the tire cover and supported by the outer annular edge thereof. 17 is a light diffusing light reflector and 18 is a light in the form of a small electric lamp between the reflector and the translucent sheet. Said reflector may be of galvanized sheet metal or other material having a dull light reflecting surface, so that when the lamp is lighted, the light therefrom will be delivered with diffusion to the translucent sheet and such diffusion makes the sign or advertisement strikingly visible.

By mounting the sheet at the inside of the tire cover with its edge overlapped by the edge of the outer rim of such cover, the inner side of the sheet is well protected from the weather.

When it is desired to change from one advertisement or sign to another, the sheet may be removed by simply turning the fastener heads, pushing the sheet inwardly and withdrawing it from inside the frame formed by the tire and the tire cover.

The rear facing of the paper may be cheese cloth and a sheet of faced parchment paper is sufficiently flexible to allow it to be rolled and unrolled without cracking but is resilient so as to normally assume a flat unwrinkled surface, and in the operation of putting the sheet in place it may be curved from flat position so as to allow it to be readily inserted into the space within the tire and cover, after which it will be flattened out and secured in a manner obvious from the foregoing description. The removal of the sheet is accomplished in a manner reverse to that just described, it being first detached, then bent sufficiently for removal, then flattened, if desired for such treatment as may be appropriate.

The reflector is provided more or less centrally with a seat 20 for a lamp socket 21, which is connected by an electric connection 22 with a suitable source of electric energy such as a battery, not shown; and is controlled independently of any other lights by a key which may be arranged at the front of the automobile under easy control of the driver.

The rim of the parchment is preferably circular to conform to the orifice enclosed by the tire and a binding 24 of tape, glue coated on one face, and bent along the midline, and cemented by its glue covered face, to both faces of the sheet all round its rim so as to reinforce said rim.

I claim:—

The combination with a tire including a cover and supporting arms for the tire; of a circular translucent sign sheet provided around its edge with swivel fasteners and adapted to close the front of the cover orifice; tabs disposed on said cover around the said orifice and being provided with openings adapted to receive said swivel fasteners; a plate closing the rear end of the cover orifice and having its inner face provided with a reflecting surface and a lamp on said plate adapted, when lighted, to diffuse light to the translucent sheet.

In testimony whereof, I have hereunto set my hand at Los Angeles, California, this 4th day of August, 1926.

ROMAN L. SANCHEZ.